United States Patent [19]

Nichols

[11] Patent Number: 4,668,757

[45] Date of Patent: May 26, 1987

[54] USE OF AROMATIC AMINES FOR SETTING EPOXIDE RESINS

[76] Inventor: Gus Nichols, 2501 Gulf Freeway, Bldg. 18, Unit 5, Dickinson, Tex. 77539

[21] Appl. No.: 593,592

[22] Filed: Mar. 26, 1984

[51] Int. Cl.$^4$ .................. C08G 59/54; C08G 59/68
[52] U.S. Cl. ......................... 528/88; 528/99; 528/104; 528/113; 528/123; 528/341; 528/362; 528/365; 560/43; 564/153; 564/156
[58] Field of Search ............... 528/88, 99, 104, 117, 528/113, 123, 407, 341, 317, 345, 365; 560/43; 564/153, 156; 525/504

[56] References Cited

U.S. PATENT DOCUMENTS

| | | | |
|---|---|---|---|
| 3,310,528 | 3/1967 | Garnish | 260/47 |
| 3,595,833 | 7/1971 | Stolton | 260/47 |
| 3,629,181 | 12/1971 | Heer et al. | 260/31.8 |
| 3,637,902 | 1/1972 | Dukes et al. | 260/830 |
| 3,714,120 | 1/1973 | Labana et al. | 260/47 |
| 3,763,102 | 10/1973 | Hoffmann et al. | 528/407 X |
| 3,786,019 | 1/1974 | Brzozowski et al. | 260/37 |
| 3,852,240 | 12/1974 | Smith | 260/47 |
| 4,101,487 | 7/1978 | Peterson | 528/88 X |
| 4,102,862 | 7/1978 | Monte et al. | 528/88 |
| 4,127,514 | 11/1978 | Waddill | 528/93 |
| 4,246,162 | 1/1981 | Schreiber | 528/104 X |
| 4,297,459 | 10/1981 | Stark | 528/88 X |
| 4,340,716 | 7/1982 | Hata et al. | 528/100 |
| 4,345,060 | 8/1982 | Ramsbotham et al. | 528/103 |

*Primary Examiner*—Earl Nielsen
*Attorney, Agent, or Firm*—Neal J. Mosely

[57] ABSTRACT

Aromatic amines and their alkyl, amide, imide or amide-imide substituted derivatives in the presence of catalytic quantities of phenols, cresols, xylenols, bisphenols, and their like cause epoxide resins to thermoset at ambient temperatures. The resulting crosslinked polymers are useful for two component solution systems which provide corrosion and temperature resistant clear coatings or paints, and can also be used as solventless, liquid, two component systems for casting clear, pigmented or filled parts.

5 Claims, No Drawings

USE OF AROMATIC AMINES FOR SETTING EPOXIDE RESINS

BACKGROUND

1. Field of the Invention

The present invention relates to polymeric compositions formed as the reaction product of epoxides and aromatic amines. More particularly, the present invention relates to a means for catalyzing the thermosetting reaction of epoxides and aromatic amines such that it proceeds at ambient temperatures.

2. The Prior Art

Mono, di or poly epoxides of p,p', diglycidyl ether of 4,4'-isopropylidenediphenol (Bisphenol A) and of novolac type epoxides in a two component, clear or pigmented solution system are the most reactive of all epoxides, and are known to thermoset at ambient temperatures with aliphatic, cycloaliphatic and heterocyclic mono, di or poly amines, but not with aromatic mono, di or polyamines. More specifically, thermosetting of epoxides with mono, di or poly aromatic amines requires heating the mixture to a temperature in excess of 110° C. A similar thermosetting at ambient temperatures requires several weeks or months to be partially accomplished which is not practical under most circumstances.

It is known that the same epoxide thermosetting with aliphatic amines or with aromatic amines under the same heating conditions and respectively equivalent stochiometrical quantities results in products having considerably different properties. Generally, the thermosetting of the same epoxide with aromatic amines yields a product having better temperature and chemical resistance properties than the corresponding aliphatic amines. However, because it is necessary to heat the mixtures to effect thermosetting, mixtures of aromatic amines and epoxides could not be used in applications where heating was not possible.

Accordingly, it would be a significant advancement in the art to provide a means whereby aromatic amines could be used to set epoxides at ambient temperatures to provide compositions having improved chemical and mechanical properties. It would be a further advancement in the art to provide a means for thermosetting epoxides with novel aromatic amines which greatly improves the chemical, thermal and mechanical characteristics of the resulting compositions. Such means are disclosed and claimed herein.

SUMMARY OF THE INVENTION

The present invention relates to the use of aromatic amines, including amides and imides, for the setting of epoxide resins. An epoxide resin set with an aromatic amine has temperature and chemical resistances which are generally superior to resistances of the same epoxide set with a stoichiometrically equivalent amount of an aliphatic amine. However, epoxides and aromatic amines generally do not thermoset at ambient temperatures but must be heated to about 150° C.

In the present invention, a catalytic amount of a phenol is added to the epoxide-aromatic amine mixture so as to cause the mixture to thermoset at ambient temperatures. This permits the use of mixtures of epoxides and aromatic amines in applications where heating is not possible such as the coating of large industrial parts or equipment.

The present invention also provides novel aromatic amine terminated amide and imide structures which improve the characteristics of epoxide compositions which are set with the amines. The present invention provides for the use of these amines to form compositions having superior mechanical, temperature and chemical resistance properties.

DETAILED DESCRIPTION OF THE INVENTION

In the present invention, hydroxy benzenes are added to mixtures of epoxides and aromatic amines to catalyze the thermosetting reaction between the epoxide and the amine such that it can proceed at ambient temperatures. As used herein, hydroxy benzenes are defined as the mono, di or poly hydroxy substituted aromatic compounds containing one, two or more benzene rings joined or fused together, as well as their mono, di or poly alkyl, alkano, phenyl, halo (chloro, bromo, fluoro and iodo), nitro, ether, carboxylic acid, and carboxylic ester derivatives and their isomers. The principle application of the present invention is in the formation of polymers where an expoxide resin is reacted with an amine having at least two reactive hydrogens such that the mixture can polymerize.

As used herein, phenol is defined as a mono, di or polyhydroxy substituted aromatic compound including aromatic compounds having aliphatic, halogen, carboxy and nitro substitutions. Ambient temperature as used herein is generally between about 5° C. and 50° C. and normally about 20°-25° C.

Illustrative examples of phenols within the scope of the present invention are cresols, xylenol, benzophenol, alkylated phenols such as butyl phenol and nonyl phenol, as well as dinitro cresols, xylenols, bisphenols, hydroquinones, their ethers, esters, alkyl or halogen (chlorine, bromine, fluorine or iodine) substituted derivatives, higher homologues, all isomers and their mixtures. It will be appreciated by those skilled in the art that other phenols would also work.

It was found that most preferably 4 to 10% by weight (based on the combined weights of epoxide and aromatic amines), of phenols, cresols, xylenols, bisphenols and their like catalyze at ambient temperatures the addition polymerizations of epoxide resins and aromatic amines. It is believed that phenols, cresols, xylenols, bisphenols and their like, being acidic in character react exothermically with the aromatic amines to form salts, which catalyze their addition polymerizations to epoxides at ambient temperatures. This catalytic effect is not limited to simple aromatic amines, but it was found to work as well as with hydroxyl, alkyl, amide, imide and amide-imide aromatic amines.

Accordingly, through the use of the catalysts, epoxides can be set with aromatic amines in applications not heretofore possible. The setting times can vary from a few minutes to a few hours, i.e., twenty-four hours or less. The use of the aromatic amines has been found to produce composites having excellent mechanical, temperature and chemical properties. The particular properties achieved depends upon the structure and characteristics of the actual amines which are used as will become more fully apparent from the following description and examples.

The present invention has particular application to two component systems which are mixed immediately prior to application. Depending upon the type of amine and epoxide which are used, it is sometimes desirable to use a solvent to dissolve the components or lower their viscosities to facilitate mixing.

Additionally, the phenols react exothermically with the aromatic amines in the present invention but generally do not react with the epoxide alone. Accordingly, it is generally advantageous to add the phenols to the epoxide in two component systems to take advantage of the heat of reaction of the alcohol and amine when the two components are mixed together.

As used herein, aromatic amines include both primary and secondary aromatic amines which have at least two aminic or iminic hydrogens which can react with the epoxides to form a polymeric composition. Both simple and complex amines can be used in the compositions of the present invention. By including various types of functional groups in the amine, the properties of the resulting compositions can be modified. For example, alkylated aromatic amines where the alkyl chain is relatively long, provide flexibility to the resulting compositions. Also, the inclusion of amide and imide groups in the amine improve the temperature resistance of the resulting amine-epoxide polymer.

Illustrative examples of aromatic monoamines which are within the scope of the present invention are aniline toluidines and xylidines including their halogen, nitro, carboxylic acid, ester or ether derivatives.

Illustrative examples of aromatic diamines which are within the scope of the invention are meta, para and ortho phenylene diamine, 1,7 naphthylene diamine, p,p′ oxydianiline, p,p′ methylene dianiline, p,p′ sulfone dianiline, their ether, ester, halogen or alkyl substituted derivatives, isomers, higher or lower homologues and their mixtures.

Other examples of aromatic diamines are the adduct of two or less moles of hydroxyethyl (or propyl) acrylate (or methacrylate), acrylonitrile, acrylamide, methyl (or alkyl) acrylate or their methyl substitued analogues with 1.0 mole of any of the above diamines under heating at 120° to 150° C. for about one half to two hours in order to respectively form either $-NH_2$ or $R_2NHCH_2CHXY$ or $R_2-(NHCH_2XCY)_2$ wherein $R_2$ is a divalent arylene aromatic radical, X is equal to hydrogen, methyl or alkyl group and Y is equal to $$-\overset{O}{\underset{\|}{C}}-NH_2, \quad -\overset{O}{\underset{\|}{C}}-NH-CH_2OH, \quad -\overset{O}{\underset{\|}{C}}-N(CH_2OH)_2,$$

$$-C\equiv N, \quad -\overset{O}{\underset{\|}{C}}-OCH_3, \quad -\overset{O}{\underset{\|}{C}}-OC_2H_5.$$

Still other examples of aromatic diamines are the adduct of 2.0 moles of aniline or chloro anilines with 1.0 mole of 1,6 hexamethylene diol diacrylate, oxotetraethylene diol diacrylate (also called tetraethylene glycol diacrylate), N,N′ methylene bis acrylamide or their methyl derivatives obtained by heating the mixtures for one half to about two hours at 120° to 150° C.

Illustrative examples of aromatic triamines are 2,4 Bis(p-aminobenzyl)aniline (BABA, a product of the E. I. duPont de Nemours & Company primarily contains this triamine) and its alkyl, ether, ester or halogen derivatives, the adduct of 1.0 mole BABA and 3.0 moles or less of a monofunctional acrylate, the adducts of 3.0 moles of aniline, toluidines or their halogen derivatives and 1.0 mole of trimethylol propane (or ethane) triacrylate or their methyl derivatives.

Illustrative examples of tetra (or poly) aromatic amines are obtained either by heating 1.0 mole of a difunctional acrylate with 2.0 moles of an aromatic diamine, or 1.0 mole of a tri or tetra functional acrylate with 3.0 or 4.0 moles respectively of an aromatic di or tri-amine.

Other illustrative examples of di or poly functional amines are the condensation products of 1.0 mole of BABA with 2 moles or less of a monofunctional anhydride such as phthalic anhydride, tetrahydrophthalic anhydride, hexahydrophthalic anhydride, methyl tetrahydrophthalic anhydride, succinic anhydride, dodecenyl anhydride, alkenyl succinic anhydride, maleic anhydride and itaconic anhydride. Such condensates are primary aromatic amine-terminated mono or di imides. With these compounds, at least one primary amine termination is needed in order to have polymerization with epoxides.

Still further examples of di or polyfunctional amines include the condensation products of 1.0 mole of BABA with 2 or less moles of hydroxy acetic acid, lactic acid, formic acid, pelargonic acid and mono functional acrylates or methyl acrylates.

As indicated previously, the temperature resistance of an amine-epoxide polymer can be improved by utilizing an amine which includes amide and imide linkages.

An example of amide-imide aromatic diamine which can be used in the present invention is the condensation product obtained by heating together 2.0 moles of p,p′ methylene dianiline with 1.0 mole trimellitic anhydride and eliminating 2.0 moles of water. A similar aromatic diamide-imide aromatic amine can be obtained by heating together 2.0 moles trimellitic anhydride with 3.0 moles of p,p′ methylene dianiline and eliminating 4.0 moles of water.

These two examples of diamines were unexpectedly produced without the use of acid chlorides or solvents. It is generally believed that aromatic acids and aromatic amines do not react because of their reduced acidity and basicity and are unable to form salts at reasonably high temperatures without decomposition. In the case of trimellitic anhydride, the anhydride group reacts with an aromatic amine exothermically to form orthoamic acid and eventually an imide linkage. The heating of 1.0 mole of p,p′ methylene dianiline or any aromatic diamine alone, or assisted by high boiling point aprotic solvents such as N-methyl pyrrolidone, yields an aromatic imide, amino acid but not an aromatic poly amideimide. However, the ratio of 2/1 or 3/2 moles of p,p′, methylene dianiline upon heating and in the absence of any solvent at 180° to 230° C. respectively results in an aromatic amide-imide diamine (C) or an aromatic di (amide-imide-amine) (D) having the following structures:

(C)

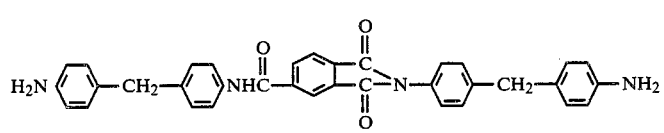

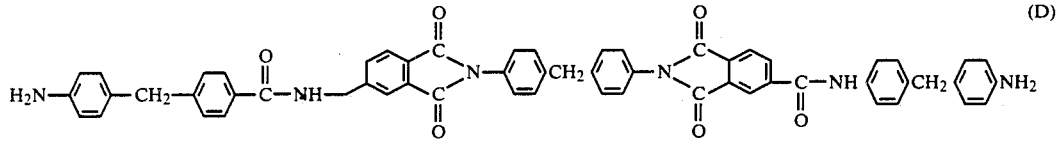

Both (C) and (D) are aromatic amide-imide diamines which melt respectively at 140° and 168° C. and yield excellent high temperature resistant castings by blending them with solid novolac, diglycidyl ether of bisphenol A or melamine epoxides.

Compounds (C) and (D) can be further reacted with formic acid, or hydroxy acetic acid in the molar ratios of 1/1 or 1/2. Compounds (C) and (D) as such, or after their condensation with 1 or 2 moles of formic acid and/or hydroxy acetic acid per mole of (C) or (D), may be used as extenders in formaldehyde-phenolic, formaldehyde-melamine, formaldehyde-urea, or furfural resins to increase their thermostability and abrasion resistance, as well as to improve other mechanical and chemical performance properties. Furthermore, compounds (C) and (D) as such, or after their condensation reactions with formic and/or hydroxy acetic acids, will react with formaldehyde or furfural to form new classes of high temperature polymers.

Other illustrative aromatic polyamines include those obtained by the addition of 1.0 mole N,N' methylene diacrylamide to 2.0 moles of metaphenylene diamine or 1.0 mole trimethylol propane triacrylate to 3.0 moles p,p' methylene dianiline or to 3.0 moles of p,p' oxydianiline, or to 2.0 moles of BABA. The resulting aromatic polyamines can be used as such, or after their partial or total condensation reactions with mono anyhydrides, formic and/or hydroxy acetic acid to thermoset epoxide resins. Those compounds having 2 or more remaining aromatic amine hydrogens can also be used as extenders for epoxides. Those having two or more amidic hydrogens can also be used as copolymeric extenders of various formaldehyde resins, as well as basic ingredients for new high temperature resistant formaldehyde or furfural resins.

Another important application of di or poly aromatic alkyl imines is their addition at ambient or slightly elevated temperatures with mono anhydrides to form N, substituted amidic acids. Such additions take place in the presence of epoxides and result in a one component solventless, clear or pigmented system which is stable at ambient temperatures but which thermosets through an addition polymerization mechanism upon heating at about 150° C.

For example, 1.0 mole of BABA reacts with 3.0 moles of hydroxyethyl acrylate to yield:

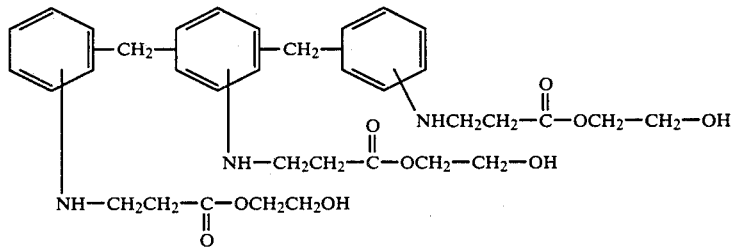

which, upon further reaction with 3.0 moles phthalic anhydride in the presence of at least 3.0 epoxide equivalents, results in:

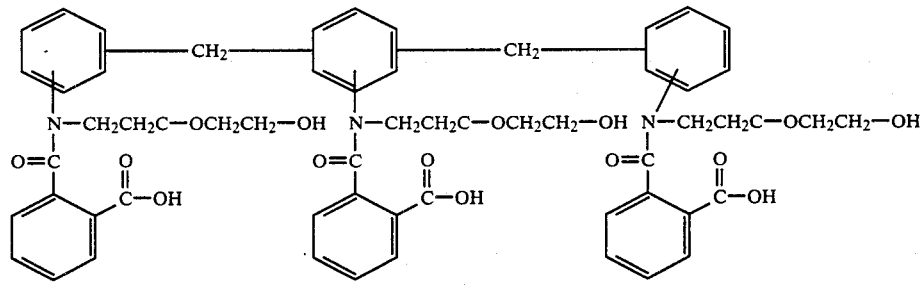

Upon adding 3 epoxide equivalents, and heating to a temperature above about 150° C., the epoxides react with the carboxy groups to form a polymer which is void free and can be used for films or castings.

The anhydride group reacts much faster with the amine than either reacts with the epoxide group. In addition to phthalic anhydride, other mono anhydrides can also be used.

EXAMPLES

Example 1

A phthalimide-amine was prepared by mixing in a 2 liter glass resin kettle equipped with a mechanical stirrer, a heating mantle, a thermocouple connected to a temperature recorder, and an overhead water trap with a vertical condenser, 2.0 moles (600 grams) of BABA (a product of the E. I. duPont de Nemours & Company containing primarily 2,4-Bis(p-aminobenzyl)aniline) and 3.0 moles (444 grams) of phthalic anhydride. Heat was applied, and at about 100° C., the BABA melted and phthalic anhydride started slowly to react. The temperature was slowly allowed to rise to 150° C., at which time water began to condense overhead. Heating continued until 3.0 moles (54 grams) of water were collected. Since 2.0 moles of BABA contain 6 primary amines and three of them reacted with phthalic anhydride to form phthalimide linkages, 3 primary amine groups remained per 2 moles of BABA phthalimide. Since the molecular weight of this BABA phthalimide is 300+222−27=495, and contains 3 aminic hydrogens, its amine equivalent is 495/3=165, which corresponds to one epoxide equivalent or 180 grams of EPON-828 or 826 (the diglycidel ether of bisphenol-A such as is produced by the Shell Corporation). In other words, 47 grams of the aromatic amine of this example correspond to 51.3 grams of EPON-828.

47 grams of this BABA phthalimide were dissolved in 28 grams of methyl isobutyl ketone and 25 grams of toluene and were warmed to form 100 grams of a clear solution of very low viscosity containing 43% by weight solids, and for convenience was named component A. Component B was formed by warming 51.3 grams of EPON-828, 5 grams ortho cresol, 12 grams toluene and 31.7 grams of methyl isobutyl ketone.

Mixing equal parts of component A with component B and applying them by sprayer, brush or roller, a touch free clear film was obtained within 3 hours at ambient temperatures and dried hard within 12 hours. The pot life of this mixture at ambient temperature was about 1½ hours. When the 5 grams of orthocresol were replaced by methyl isobutyl ketone, the film which was formed remained tacky for weeks. Less cresol increases the setting time and more of it decreases it.

Similar results were obtained when the ortho cresol was replaced with phenol, chlorophenol, dinitro cresol, nonyl phenol, bisphenol A, hydroquinone, or ditertiary butyl hydroquinone. It was also found that catalytic activity increases when more acidic phenols or cresols such as the chloro phenols, dinitro cresols and their like are utilized. In the case of the stronger acidic catalysts, even 2 to 3% by weight of catalyst is sufficient to cause the mixture to polymerize within a reasonably short time.

The above condensation reaction was repeated in two additional experiments by heating together 2.0 moles of BABA with 4.0 and 2.0 moles of phthalic anhydride to respectively remove 4 and 2 moles of water and form the corresponding aromatic amine-imides having amine equivalents of 280 and 107.5, respectively. The same experiments described above were repeated with these compounds using ketone, alcohol and toluene solvents, and EPON-828 and EPON-1007 epoxides containing 5% by weight of nonyl phenol and butyl phenol. Results similar to those above were obtained with these mixtures. Omission of the phenolic type catalysts yields tacky and unreacted films.

Example 2

In a 2.0 liter resin kettle equipped as described in Example 1 were placed 2.0 moles (600 grams) of BABA, 2.0 moles (530 grams) of dodecenyl succinic anhydride and 2.0 moles (152 grams) of hydroxy acetic acid and heated from 150° to 200° C. until 4.0 moles (72 grams) of water were removed. The resulting product was an aromatic amine-amide-imide having a molecular weight of 625 and an amine equivalent of 312.5 which corresponds to 170 grams of Novolac Resin-431.

31.25 grams of this aromatic amine-amide-imide were dissolved in 6.4 grams methyl ethyl ketone and 5 grams of toluene to form component A. Component B was formed by mixing 17 grams of Novolac-431, 2.4 grams o-chlorophenol and 2.9 grams methyl ethyl ketone. The thermosetting of 31.25 grams of this aromatic, amine-amide-imide with 17 grams of Novolac-431 results in an adduct composed of about 65% and 35% by weight respectively of a very flexible aromatic amide-imide epoxide composite having excellent temperature and resiliency properties. The mixing ratio of component A to B was 2/1 by weight and the total solid content of the mixture was about 79% by weight solids.

The same experiment was repeated by heating 2.0 moles (600 grams) BABA, 3 moles (138 grams) formic acid and 1.0 mole (144 grams) of 2-ethyl hexyl carboxylic acid to form an aromatic amine-diamide which was substituted for component A. Again this system was air dried at ambient temperatures and provided a flexible aromatic amide composite having excellent temperature and resiliency properties.

Example 3

In the same resin kettle described in Example 1 were placed 2.0 moles (600 grams) of BABA, 1.0 mole (98 grams) maleic anhydride, 1.0 mole (152 grams) of tetrahydrophthalic anhydride and 1.0 mole (224 grams) of dodecanoic (lauric) acid. This mixture was heated to between 150° to 200° C. to form an aromatic amine-amide-imide through the elimination of 3.0 moles of water. The composition has a molecular weight of 510 and an amine equivalent of 170, since it contains 3 aromatic aminic hydrogens. When this amine-amide-imide is mixed with a stoichiometrically equivalent amount of a dissolved epoxide resin containing 4 to 10% by weight of a catalyst such as dibutyl hydroquinone, dinitro cresol or cresol, the mixture thermosets within 3 hours at ambient temperatures.

Example 4

In the same resin kettle described in Example 1 were placed 2.0 moles (496 grams) of p,p' sulfono dianiline and 1.5 moles (231 grams) of hexahydrophthalic anhydride and heated to a temperature from about 150° to 200° C. until 1.5 moles of water were removed. The resulting product was a partially imidized aromatic sulfone amine, having a molecular weight of 350 and an aromatic amine equivalent of 350/3=116.7. Again, 11.67 grams of this amine in a solution of methyl ethyl ketone-toluene and 18 grams of EPON-826 containing 1.3 grams of xylenol thermosets at ambient temperatures within a few hours.

Example 5

In the same two liter glass resin kettle described in Example 1 were placed 2.5 moles (500 grams) of p,p' oxydianiline and 2.0 moles (600 grams) of oxotetraethylene diacrylate (also called tetraethylene glycol diacrylate and heated at about 120°, to 150° C. for about one hour. When the mixture developed a significat viscosity (indicating that the addition mechanism was substantially achieved), 1.0 mole (132 grams) of hydroxypropylene acrylate was added. Heating continued for an additional 30 minutes at 135° C. The final product was polyalkylene aromatic-imine having a molecular weight of 2464 and an amine equivalent of 2404.4. This polymeric imine is liquid and 24.64 grams of it were mixed with 18 grams of EPON-828 containing 1.7 grams of nonyl phenol, and used to form films which dried within 3 hours at ambient temperatures.

Example 6

492.8 grams of the aromatic polyimine of Example 5 were mixed at ambient temperatures with 2.0 epoxide equivalents (280 grams) of cycloaliphatic dimethylcyclohexane-epoxide glycolate (CY-179, a product of the Union Carbide Company) and to it were added under constant mixing 2.0 moles (308 grams) of hexahydrophthalic anhydride, and 2522 grams of aluminum trihydrate under slight heating to fluidize the mixture. Upon cooling a solid resulted which was a homogenous mixture of an aromatic polyortho N-substituted amide with 30% cycloaliphatic epoxide and 70% aluminum trihydrate. This mixture was ground to a fine powder which is stable upon storage at ambient temperatures, and thermosets upon heating at above 150° C. for at least 30 minutes to yield void free films or parts having excellent nontracking performance properties. Excellent nontracking performance properties means that the polymer does not decompose to carbon when subjected to high voltages. While organic polymers are generally nonconductive, the carbon which is formed upon decomposition is highly conductive. Thus, tracking performance properties are important when a polymer is used as an insulator.

Example 7

In the same 2 liter glass resin kettle described in Example 1 were placed 4.0 moles (792 grams) p,p' methylene dianiline (MDA) and 2.0 moles (384 grams) of trimellitic anhydride (TMA). The mixture was slowly heated until it melted. At about 105° C. the MDA begins to react slowly, but exothermically, with the TMA and opens the anhydride ring to form the orthoamide carboxylic acid of the corresponding TMA-MDA aromatic amino acid. Heating was continued above 150° C., at which point the whole mixture was solidified. As the temperature was raised to above 170° C., water started to condense, and the mixture was liquified slowly from the bottom up. The first step of this reaction is the reformation of the aromatic imide amino acid, which in this case corresponds to removal of 2.0 moles (36 grams) of water.

It is generally accepted that aromatic imide amino acid, as well as aromatic acids and aromatic diamines do not condense at 300° C. even in the presence of catalysts or aprotic solvents. That is why the chlorides of aromatic acids or the chlorides of amino aromatic acid in the form of its hydrochloric amine salts have been used in making aromatic polyamides or aromatic polyimides. Unexpectedly from these predictions the 2/1 molar ratio of MDA/TMA proceeds to condense at 170° to 240° and yields the type AB aromatic diamine-amide-imide having the following structure:

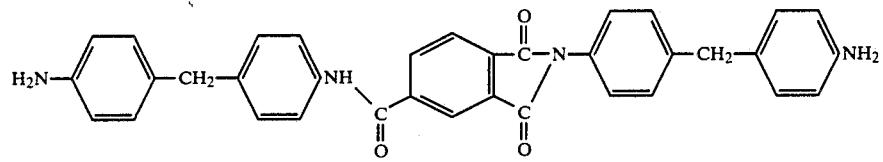

Type AB in this case designates the repitition sequence of the amide and imide groups wherein A represents an amide linkage and B represents an imide linkage.

The same experiment was repeated using 3.0 moles MDA and 2.0 moles TMA. Again at 165° C. the mixture turned to a solid and through further heating up to 230° C. it cleared from the bottom and formed through the elimination of 4.0 moles of water the type ABBA aromatic di(amine-amide-imide) having the following structure:

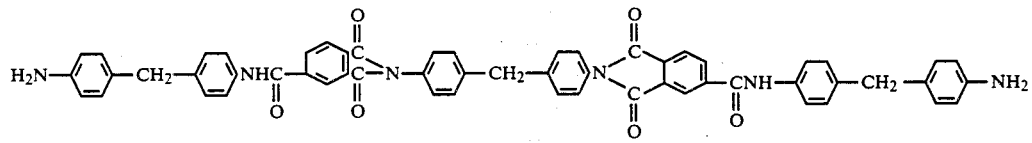

Type ABBA designates the repetition sequence of amide and imide groups wherein A represents the amide linkage and B represents an imide linkage. It is known that aromatic polyamides of type ABBA versus type AB are more thermally stable and it is believed also to be true for aromatic type ABBA polyamide-imides.

The type AB aromatic amine-amide-imide is soluble only in aprotic solvents such as N,N, dimethyl acetamide, N-methyl pyrrolidone, and their like, as well as phenols and cresols. It has a molecular weight of 552 and an amine equivalent of 138. The type ABBA aromatic di(amine-amide-imide) is soluble only in aprotic solvents, as well as phenols and cresols containing aromatic hydrocarbons. It has a molecular weight of 906 and an amine equivalent of 226.5. Solutions of type AB and ABBA in phenol or cresols diluted with aromatic hydrocarbons instantly react with liquid or solid epoxides causing premature gelations. Accordingly, the use of aprotic solvents are preferred.

13.8 grams of the type AB amine-amide-imide were dissolved in 13.8 grams of N,N, dimethyl acetamide and 7.4 grams xylene to form component A. Component B was formed by dissolving 17 grams of Novolac-439 (a product of the Dow Chemical Company) in 17.5 grams of methyl ethyl ketone containing 0.5 grams of ortho cresol. Equal parts of component A and B were mixed as clear or pigmented systems and were thermoset at ambient temperatures within 4 hours.

The same experiment was repeated with type ABBA solutions in N,methyl pyrrolidone by taking into consideration the different amine equivalents. Again, the catalytic amounts (4-10 wt. %) of phenol type catalysts are effective and practical in getting the mixture to thermoset at ambient temperatures. However, when these catalysts became the solvent the reactivity was so high that it became impractical to apply the system. This suggests that non-catalyzed aromatic amine epoxide systems can be thermoset in chambers containing vapors of cresol, phenols and their like. The rate of thermosetting in such a system is proportionate to the amount of the acid catalysts.

Example 8

In the two liter glass resin kettle described in Example 1 were placed 2.0 moles (400 grams) of p,p' oxydianiline and 2.0 moles (142 grams) of acrylamide. The mixture was heated at about 120° to 150° C. for 2 hours to form the resulting substituted propionamide having a molecular weight of 271 and an amine equivalent of 90.3.

The same experiment was repeated by heating 2.0 moles (400 grams) of p,p' oxydianiline, 2.0 moles (142 grams) acrylamide and 2.0 moles (106 grams) of acrylonitrile. The resulting product is composed of compounds wherein the oxydianiline structure is substituted by propionamide and groups having a molecular weight of 324 and an amine equivalent of 162.

The experiment was, again repeated by using 2.0 moles (400 grams) of p,p' oxydianiline, 1.0 mole (152 grams) of N,N, methylene bis acrylamide and 2.0 moles (232 grams) of hydroxyethylene acrylate to form an alkene N-substituted aromatic tetraimine having a molecular weight of 784 and an amine equivalent of 196. Similar experiments were carried out by replacing p,p' oxydianiline with meta or para phenylene diamine, p,p' sulfone dianiline or p,p' methylene dianiline and the N,N'bismethylene acrylamide, acrylamide, acrylonitrile and their methyl derivatives.

All these aromatic N-alkyl and/or alkylene substituted di or poly amines are liquid or solids having low melting points, and were readily solubilized by ketone or alcohol-hydrocarbon solvents. If mixed with the stoichiometrical quantities of liquid or solid epoxides containing phenolic and cresolic type catalysts, these compositions will thermoset at ambient temperatures.

Another application of the above aromatic N,N alkyl and aklylene substituted polyimines provides practical liquid, solventless systems with liquid epoxides which in the absence of phenolic catalysts can be heated below 70° C. to significantly reduce their viscosity prior to their curing. Such liquid, solventless systems of low viscosity thermoset upon heating at above 110° C. through an addition polymerization to provide clear or pigmented films or parts which are compact and void free.

Example 9

In the two liter glass resin kettle described in Example 1 were placed 1.0 mole (300 grams) of BABA and 1.0 mole (148 grams) phthalic anhydride. The mixture was heated from 150° to 180° C. for about 1½ hours until 1.0 mole (18 grams) of water was removed. Then the temperature was allowed to decrease to 135° C, Then 2.0 moles (232 grams) of hydroxyetheylene acrylate were added and heating was continued for one additional hour. The final product is an aromatic imide-diimine having a molecular weight of 662, an amine equivalent of 331, and was of liquid consistency.

66.2 grams of this compound were mixed with 18 grams of EPON-828 and cured for 30 minutes at 150° C. Thermogravimetric analysis (TGA) suggested it to be satisfactory for continuous use at a temperature of 180° C. while most simple aromatic amine epoxides suggest a maximum temperature of 155° C. for continuous use.

Example 10

66.2 grams of the aromatic imide-diimine of Example 9 were mixed with 20 grams EPON-826 and 29.6 grams of phthalic anhydride and heated to 150° C. for 30 minutes. Again TGA analysis suggested a material satisfactory for continuous use at 192° C.

Example 11

In a two liter glass resin kettle equipped as described in Example 1 were placed 3.0 moles (279 grams) of aniline and 1.0 mole (296 grams) of trimethylol propane triacrylate and heated at 135° C. for 1½ hours. The resulting triimine had a molecular weight of 575 and an amine equivalent of 191.7. This triimine thermosets at ambient temperatures with liquid or solid epoxides containing 4 to 10 weight percent of phenolic type catalysts.

Example 12

In another experiment 575 grams (1.0 mole) of the aromatic triimine of Example 11 were heated with 444 grams (3 moles) of phthalic anhydride to form an aromatic alkylene N-substituted or ortho amide phthalic acid having a molecular weight of 1019 and a carboxylic acid equivalent of 339.6. It is customary to use 0.75 to 1 per carboxylic acid equivalent of epoxide.

In another experiment 1.0 mole (575 grams of this aromatic triimine were mixed and heated with 3.0 moles (576 grams) of trimellitic anhydride to form an aromatic N-substituted amide hexacarboxylic acid having a molecular weight of 1151 and a carboxylic acid equivalent of 387. The adducts of the triimine with phthalic anhydride or trimellitic anhydride produce homogeneous, solventless one component systems which are stable at ambient temperatures and which thermoset through an addition polymerization mechanism upon heating at above 150° C.

Example 13

In the glass resin kettle described in Example 1 were placed 4.0 moles (432 grams) of metaphenylene diamine, 3.0 moles (678 grams) of 1,6 hexamethylene diol diacrylate and 2.0 moles (92 grams) of formic acid and heated at about 140° C. to remove 2.0 moles (36 grams) of water and form a liquid diformamide aromatic-alkylene ester hexamine having an average molecular weight of 1166 and an amine equivalent of 194.3. This aromatic formamide alkylene hexamine was placed in a methyl ethyl ketone solution by using 194.3 grams of the hexamine, 75.7 grams methyl ethyl ketone and 30 grams of toluene. This mixture was designated as component A. Component B was formed by adding 18.7 grams of ortho cresol to 180 grams of EPON-828.

19.87 grams of component B were ground with 30.13 grams titanium dioxide (rutile type) pigment and mixed with 30 grams of component A to form a white enamel which thermoset in 3 hours at ambient temperature to a touchfree film.

A paint of grayish shade was obtained by grinding 19.87 grams of component B with 29 grams titanium dioxide (rutile) and 1.13 grams of carbon black. This was mixed with 30 grams of component A and sprayed at ambient temperatures.

A greenish shade was obtained by mixing 19.87 grams of titanium dioxide and 15 grams of green oxide and mixing with 30 grams of component A.

A reddish shade was obtained by mixing 19.87 of component B and 10.13 grams of molybdenum red and 30 grams of component A.

A bluish shade was obtained by mixing 19.87 grams of component B with 5 grams of phthalocyanine blue, 5.13 grams tritanium dioxide rutile, and 30 grams of component B.

A brick reddish shade was obtained by mixing 19.87 grams of component B, 10.13 grams titanium dioxide, 5 grams of red iron oxide, 5 grams silica flour and 30 grams of component A.

Example 14

In the glass resin kettle described in Example 1 were placed 2.0 moles (400 grams) of p,p' oxydianiline and 1.0 mole (100 grams) of methyl acrylate. This mixture was heated at 140° to 180° C. for about 2 hours until 1.0 mole (32 grams) of methanol was removed. The resulting product was an aromatic 1,3 imine propionamide of bis p,p' oxydianiline having the structure:

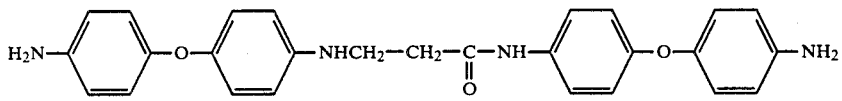

a molecular weight of 468 and an amine equivalent of 93.6. This amide-imine-diamine was used to make component A by using methyl isobutyl ketone and toluene as solvents.

When component A is mixed with a stoichiometrically equivalent amount of an epoxide and 4 to 10 weight percent of a phenolic catalyst, it thermosets at ambient temperatures.

In another experiment, 9.36 grams of the aromatic amide-imine diamine and 17 grams of Novolac-439 (Dow) were mixed together, and to this mixture was added 35 to 60% by weight of the final composite of fiber glass, fiber cloth, graphite and Kevlar fibers, to form laminates which thermoset upon heating at 150° C., for 30 minutes. These laminates have excellent temperature resistance and mechanical performance properties.

In another experiment, 1.0 mole of the above amide-imine diamine was added to 0.5 moles (151 grams) of tetraoxoethylene diacrylate and heated at 140° C. for 1 hour, followed by the addition of 1.0 mole (132 grams) hydroxyl propylene diacrylate and heated for one additional hour. The final product was an aromatic diamide hexaimine having a molecular weight of 1592 and an amine equivalent of 265.3. Again, the aromatic hexaimine thermosets at ambient temperatures with epoxides containing phenolic type catalysts.

Additional experiments were performed to form laminates by using mixtures of 26.5 grams of the aromatic diamide hexaimine, 17 grams of Novolac-431 (a product of the Dow Chemical Co.) resin and fiber glass, glass cloth, graphite and Kevlar fibers. These laminates thermoset upon heating at 150° C. for about 30 minutes.

26.5 grams of the aromatic diamide hexaimine, 14.8 grams of phthalic anhydride and 18 grams of Novolac-431 (Dow) epoxy resin were mixed and heated to form a homogenous mixture which was solid at ambient temperatures. Upon grinding it was converted to fine powder which was placed between sheets of glass cloth, graphite and Kevlar, and heated under 100 psia pressure at 150° C. to form laminates composed of 35% resin and 65% reinforcement. Such composites were found to have much better temperature resistance, chemical resistance, and mechanical properties than any known simple epoxide composite.

Example 15

In the two liter glass resin kettle described in Example 1 were placed 2.0 moles (600 grams) of BABA, 2.0 moles (296 grams) of phthalic anhydride and 4.0 moles (184 grams) of formic acid. The mixture was slowly heated to 180° C. until 6 moles (108 grams) of water were removed. The temperature was then allowed to drop to about 80° C., and 4.0 moles (384 grams) of furfural were added. Heating continued at 80° C. for an additional 3 hours until a very viscous material was obtained. Heating a thin film of this mixture at 150° C. for about 5 minutes resulted in a thermosetting film having excellent high temperature resistence performance properties.

The same experiment was repeated by replacing formic acid with hydroxy acetic acid and by replacing furfural with formaldehyde.

In other experiments, BABA was replaced with the AB and ABBA aromatic amine-amide-imides of Example 7, phthalic anhydride was omitted, the formic acid was partially but equivalently replaced by hydroxy acetic acid and separately furfural, as well as formaldehyde, were added to those condensates to form viscous solutions. Again, thermosetting films having excellent temperature resistence performance properties were obtained upon heating.

It should be appreciated that while the invention has been described in reference to the presently preferred embodiments, the invention may be embodied in other specific forms without departing from its spirit or essential characteristics. Thus, the described embodiments are to be considered in all respects as illustrative and not restrictive. The scope of the invention is, therefore, indicated by the appended claims rather than by the foregoing description, and all modifications or changes which come within the meaning and range of equivalency of the claims are to be embraced within their scope.

What is claimed is:

1. A polymerizable composition comprising:
   an epoxide resin;
   an aromatic amine comprising the condensation reaction product of n moles of 2,4-Bis (p-aminobenzyl) aniline and up to 2n moles of phthalic anhydride, tetrahydrophthalic anhydride, hexahydrophthalic anhydride, methyl tetrahydrophthalic anhydride, maleic anhydride, itaconic anhydride, succinic anhydride, alkenyl succinic anhydride, formic acid, acetic acid, hydroxy acetic acid, or pelargonic acid, or mixtures thereof; and
   a catalytic amount of a phenol which causes the epoxide resin and the aromatic amine to thermoset at ambient temperatures within a few hours.

2. A polymerizable composition comprising:

an epoxide resin;
an aromatic amine comprising the condensation reaction product of n moles of a diamine selected from the group consisting of p,p' methylene diamine, p,p' sulfono dianiline, and p,p' oxydianiline, and 0.25n to n moles of a monoanhydride and/or a monocarboxylic acid; and
a catalytic amount of a phenol which causes the epoxide resin and the aromatic amine to thermoset at ambient temperatures within a few hours.

3. A polymerizable composition comprising:
an epoxide resin;
an aromatic amine comprising the condensation reaction product of n moles of 2,4-Bis (p-aminobenzyl) aniline and up to 3n moles of hydroxyethyl acrylate, hydroxyl propyl acrylate, acrylonitrile, acrylamide, methyl acrylate, ethyl acrylate or mixtures thereof; and
a catalytic amount of a phenol which causes the epoxide resin and the aromatic amine to thermoset at ambient temperatures within a few hours.

4. A polymerizable composition comprising:
an epoxide resin;
an aromatic amine comprising the condensation reaction product of 1.6 n moles of a diamine selected from the group consisting of p,p' methylene dianiline, p,p' sulfono dianline, p,p' oxydianiline, and from n to 2 n moles of a monoacrylate; and
a catalytic amount of a phenol which causes the epoxide resin and the aromatic amine to thermoset at ambient temperatures within a few hours.

5. A polymerizable composition which thermosets upon heating at about 150° C. through an addition polymerization mechanism comprising
(1) the product of reacting n moles of hexamethylene diol diacrylate with n moles of p, p'-methylene dianiline at 120° to 150° C. for about 0.5 to 2.0 hours and cooling below 100° C.,
(2) 2n moles of phthalic anhydride, and
(3) at least 2n equivalents of liquid diepoxide,
plus pigments, fillers and dyes.

* * * * *